Jan. 7, 1964     D. HOLLAND ETAL     3,116,661
AUTOMATIC TYPE PLACEMENT SYSTEM
Filed March 17, 1961     5 Sheets-Sheet 1
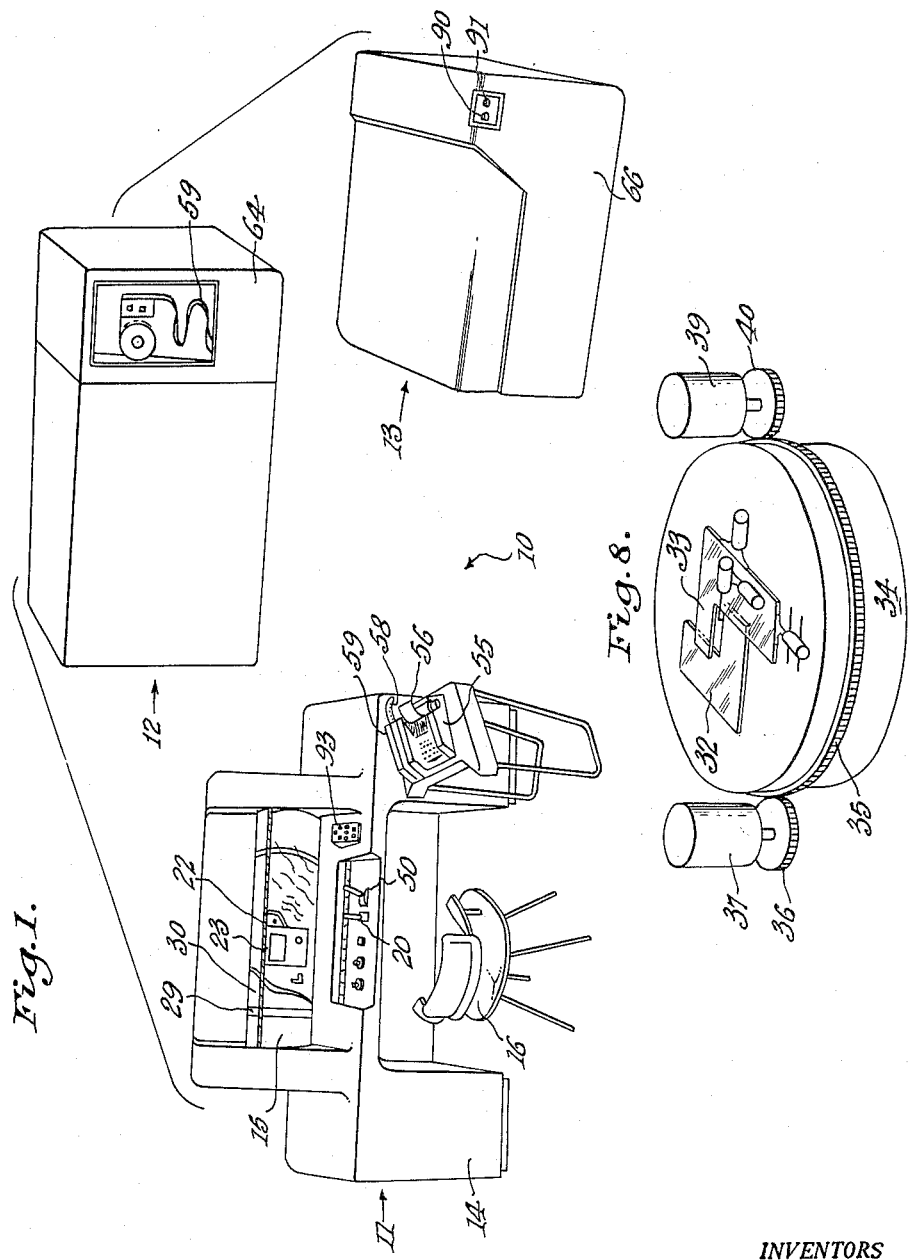
INVENTORS
Charles W. Schlager
David Holland
BY
ATTORNEYS

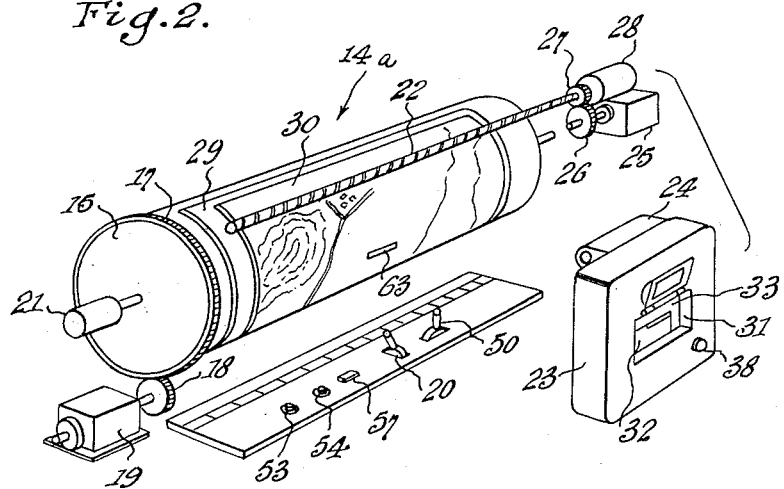
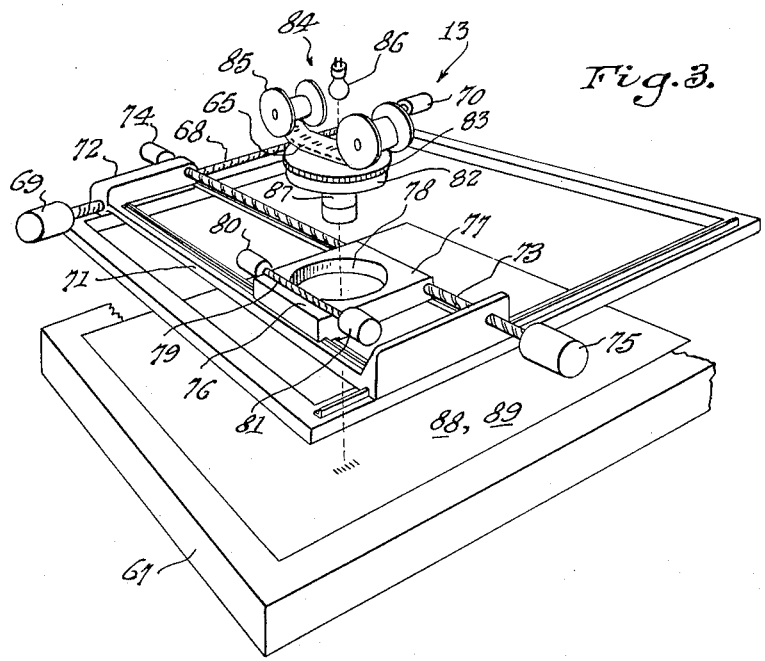

Jan. 7, 1964 D. HOLLAND ETAL 3,116,661
AUTOMATIC TYPE PLACEMENT SYSTEM
Filed March 17, 1961 5 Sheets-Sheet 3

INVENTORS
Charles W. Schlager
David Holland
BY
ATTORNEYS

Jan. 7, 1964     D. HOLLAND ETAL     3,116,661
AUTOMATIC TYPE PLACEMENT SYSTEM
Filed March 17, 1961     5 Sheets-Sheet 4

INVENTORS
Charles W. Schlager
David Holland
BY Joseph A. Hill
Bonifant Hamilton
ATTORNEYS INVENTORS
Charles W. Schlager
David Holland
BY
ATTORNEYS

3,116,661
AUTOMATIC TYPE PLACEMENT SYSTEM
David Holland, Washington, D.C., and Charles W. Schlager, Kensington, Md., assignors to the United States of America as represented by the Secretary of the Army
Filed Mar. 17, 1961, Ser. No. 96,620
2 Claims. (Cl. 88—24)
(Granted under Title 35, U.S. Code (1952), sec. 266)

The invention described herein may be manufactured and used by or for the Government for governmental purposes without the payment of any royalty thereon.

The present invention relates to map making and refers more particularly to automatic type placement in the making of a names film.

A common method of printing a modern topographic map in five or six colors is by offset lithography; that is to say, a separate press plate is prepared for each color. Almost all the names on the map appear in black type, and a positive or negative names film must be prepared, which is used in the preparation of the black press plate. Names to appear in other colors must similarly be made into names films, the content of which is then made up into the respective color plates.

Conventional practice in the preparation of the names film includes working with a color proof and a compilation names overlay. The color proof is an intermediate product or manuscript which is a process proof from all the color separation negatives, but lacking the names. The compilation names overlay is a translucent film laid over the color proof and comprising the names inscribed thereon in approximate position.

With this information, the operator orders the names to be printed in a particular type face and size, and six copies of each name are made on translucent film on a typesetting machine. The six impressions are necessary to allow for spoilage and for distribution to editors, etc. If an editor discovers a mistake in a name, all six copies are recalled and six new copies are made.

The exact location of each name must then again be found, and the names are manually "stuck up" by adhesive on a names overlay which is a transparent or translucent film overlying the color proof.

Most of the names must be exactly parallel to the neat line and others must be at a certain inclination thereto. Meeting these conditions requires great care in a manual operation. Each name when correctly placed must be burnished. The "stuck up" names overlay, in addition to the above disadvantages, can require still more work if any of the names become unstuck and therefore the names overlay must be handled with extreme care to prevent unsticking of names.

When the names overlay is complete, it is contact copied onto photographic film and thus becomes the names film. The latter must then be "opaqued" to remove the image of the periphery of the film on which each individual name appeared on the names overlay. The process is long and tedious and therefore expensive.

The general object of the present invention is to reduce the number of individual operations necessary in the present method of producing the names film.

In accomplishing the objects of the present invention, means are provided for recording the exact size and location of each name, for marking the color proof with a space corresponding to the size and location of each name ordered by the operator, thus facilitating the choice of size, style and location of each subsequent name, and for automatically exposing the name in its proper location on the names film, thus eliminating the necessity of again finding the name location, and further eliminating entirely the names overlay and the necessity of "opaquing" the names film made from the overlay according to present methods.

The instrumentalities chosen to provide the desired results include a coordinate meter having a transversely extending rotatable drum for the reception of the color proof, rotation of the drum providing Y coordinates of name locations. An X coordinate arm extends over the drum parallel to the axis thereof and the longitudinal position of a turret movable lengthwise of the X arm gives X coordinates. The turret is also rotatable in a plane tangent to the circumference of the drum in order to represent the inclination of a name location from parallelism to the neat line of the map, and the amount of rotation is the theta coordinate of the name location. Individual motors produce motion in the drum and in the longitudinal and rotational movements of the turret and these motors are controlled by manual switches governing direction and speed so that the turret may assume any position relative to any point on the mansuscript as directed by the operator.

The operator directs the turret to the location of the first name, viewing the general area through a two part transparent mask mounted on the turret. He pushes buttons on the programming console which contains the coordinate meter, thus selecting a size and style of type face for the name. He then types the name on an electric typewriter having tape punch means. The typewriter also types an alphanumerical description of the size and style of type face of the name, said description coming automatically from the programming console when the "record" button is pushed, thus activating a stepping switch which actuates both the typewriter and the tape punch. The name and description of type face thus appears in conventional "hard copy" typescript form on the paper in the typewriter. Simultaneously with the operation of the typewriter, the same information contained in the hard copy is translated by the tape punch means into digital form and punched on a paper tape. The coordinates of each name location are also fed by the coordinate meter to the tape punch means and punched onto the tape together with the other information about the name. Also simultaneously, the two part mask opens to expose the exact location of the name on the color proof, and a pen or pencil type scriber, following the outline of the mask aperture when the name is complete, marks the name location on the color proof or on a translucent matte surface overlay.

The products of the above operations are a color proof or translucent overlay marked with exact locations of name spaces, and two type orders. The hard copy alphanumerical order is suitable for any typesetting machine capable of manual operation, and the punched tape is adapted to direct any typesetting machine provided with means for decoding the digital information on size, style and content of the names, and of executing automatically the type order constituted by such information.

Either the hard copy or the punched tape is then used as a type order to produce on a photo typesetting machine a strip of 70-mm. film having the names appearing thereon in the chosen size and style and in the same sequence as that in which the order was placed.

The 70-mm. film strip of names having been made, is inserted in a projector head mounted on the turret of an electromechanical coordinatograph. The latter is a device physically similar to the coordinate meter, but having a flat table instead of a drum. A Y-axis arm extends along the left border of the table and the X-axis arm is mounted on the Y-axis arm. Movement of the X arm along the Y-axis arm gives the Y coordinate. The coordinatograph is further provided with connections and actuating means by which it can follow as a slave unit every motion of the coordinate meter either simultaneously through a direct connection or subsequently by means of the punched tape and tape reading means. A photosensitive film is mounted on the table of the coordinatograph, the latter being totally enclosed in a lightproof cabinet.

In the recommended procedure, the punched tape will then be used to command the coordinatograph to proceed to the location of the first name, expose said name from the film strip onto the sensitized film on the table, and to repeat the process until each name has been exposed.

The direct connection of coordinate meter to coordinatograph is then used to enter certain indicia such as contour numerals, vegetation symbols, etc., on the names film without the necessity of programming such indicia on the tape or on the film strip. A film font of desired symbols is provided for the projector head, and the operator may at random select indicia and locations for the same, and expose them onto the names film, bringing up each location on the names film which he is about to expose by bringing up the corresponding location on the color proof on the coordinate meter, and controlling the exposure of indicia from a special keyboard.

Referring now in detail to the drawings, in which is illustrated the preferred embodiment of the invention:

FIG. 1 is a perspective view of the system for automatic type placement;

FIG. 2 is an exploded perspective view of parts of the coordinate meter;

FIG. 3 is an exploded perspective view of the principal parts of the coordinatograph;

FIG. 8 is a perspective view of the coordinate meter turret and associated elements.

Figure 4:
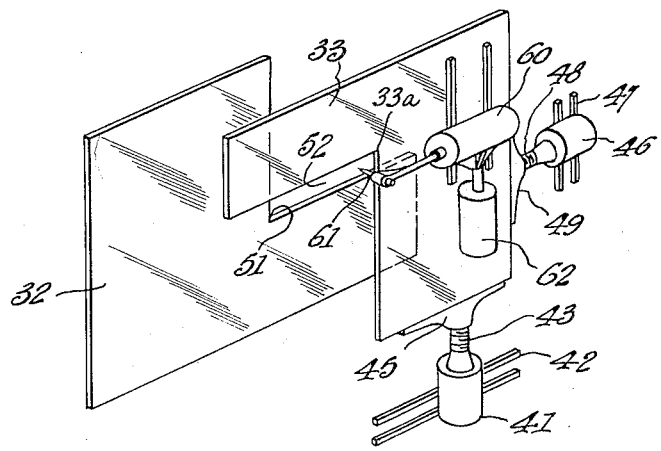
FIG. 4 is an enlarged perspective view of the viewing mask and scriber means of the coordinate meter.
Figure 7:
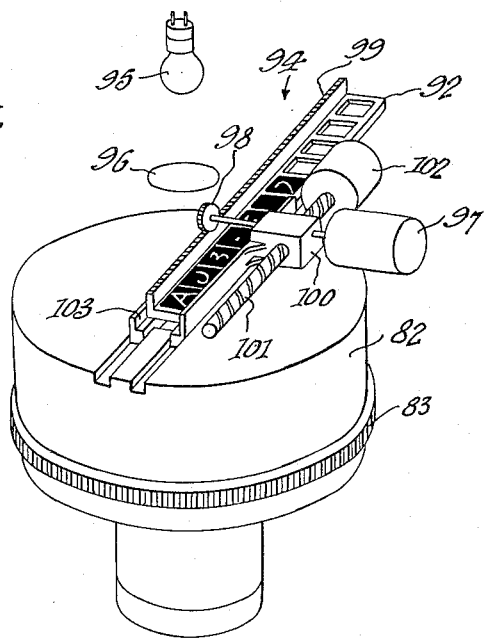
FIG. 7 is a perspective view of the projector head with an auxiliary film type font in operative position.
Figure 5:
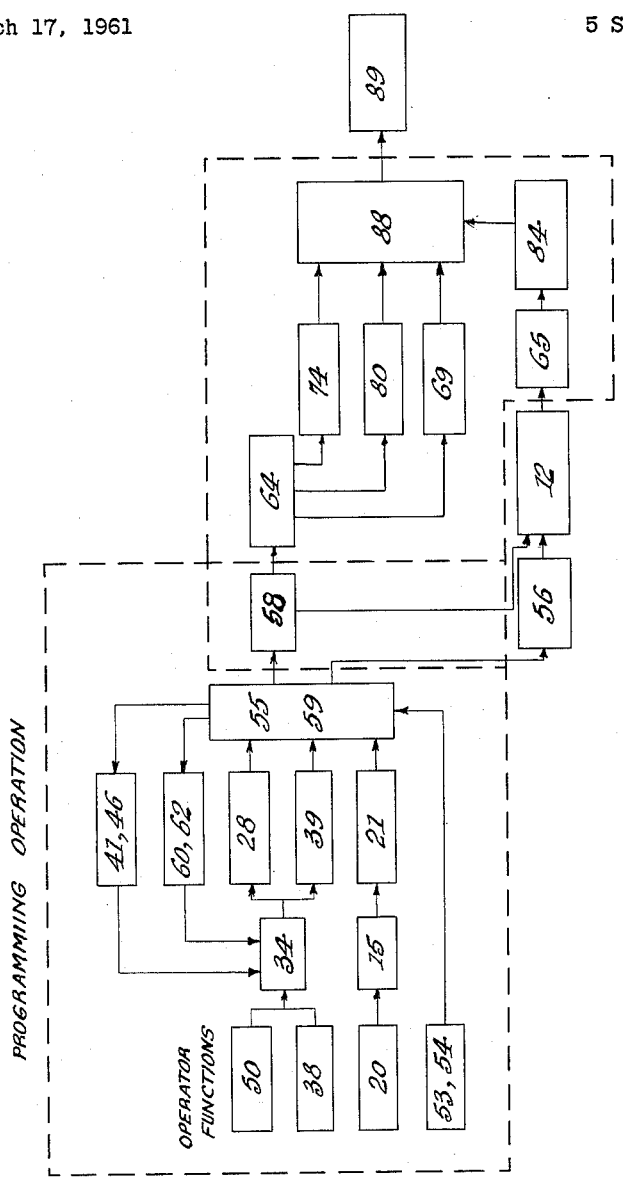
FIG. 5 is a schematic showing of the system operating with punched tape and film strip.
Figure 6:
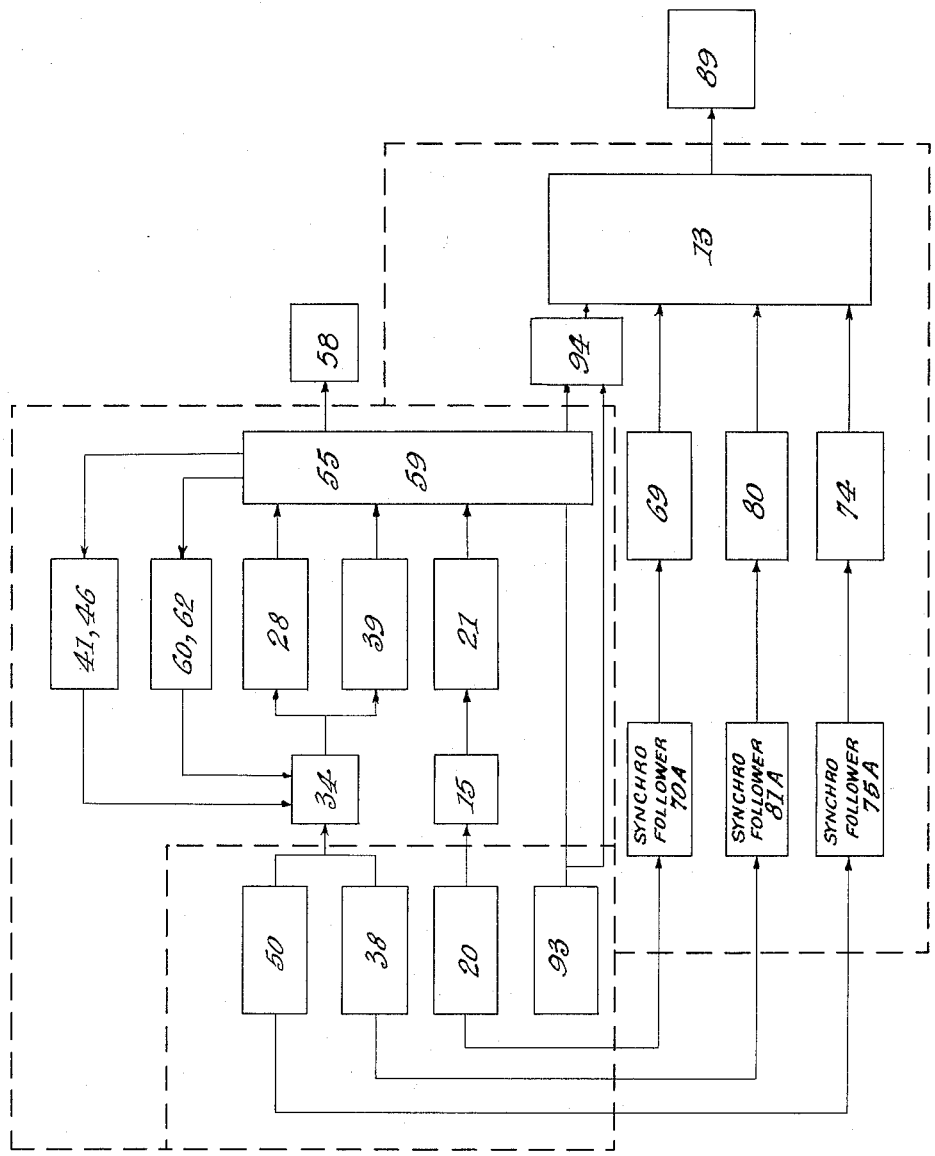
FIG. 6 is a schematic showing of the system operating with the coordinate meter connected directly to the coordinatograph.

The system 10 of automatic type placement is constituted of three principal components, namely the programmer 11, the conventional photo type setter 12, and the electromechanical coordinatograph 13.

The programmer 11 has a cabinet 14 shaped as a desk-like console which houses the coordinate meter 14a the central component of which is the rotatable drum 15 extending transversely thereof substantially at eye height of an operator seated in the chair 16. Drum 15 comprises the ring gear 17 meshing with spur gear 18 on the shaft of variable speed, reversible motor 19 which may be energized for exactly controllable rotation in either direction through conventional intermediate means controlled by the lever 20. The direction and distance of rotation of drum 15 is measured by the digitalizer 21 operatively connected thereto.

The X coordinate lead screw 22 extends transversely of cabinet 14 parallel to the axis of drum 15. Rotation of drum 15 relative to screw 22 gives the Y coordinate values of name locations.

Slidably mounted on screw 22 is the head 23, a generally rectangular box-like structure having a bracket 24 slidably engaged around screw 22 and housing ball nut means engaging screw 22. Screw 22 is rotated in either direction by motor 25 through the meshed gears 26, 27. Rotation of screw 22 causes head 23 to move right or left of FIGS. 1 and 2 parallel to the axis of drum 15, thus giving X coordinates of name locations. Mensuration of X coordinates is accomplished by the digitalizer 28 operatively connected to lead screw 22.

A manuscript such as a color proof 29 is mounted on the outer circumferential surface of drum 15. If desired, a translucent matte surface film 30 may be mounted in overlying relation to color proof 29.

The color proof 29 is in the direct view of the operator, as clearly seen in FIG. 1, and particular portions thereof as desired may also be seen through the viewing window 31 of head 23. Behind window 31 are located the two L-shaped portions 32, 33 of the transparent mask, said mask 32, 33 and its associated actuating means being mounted on the turret 34 which is rotatably mounted in head 23 is a plane substantially tangent to the circumferential surface of drum 15, thus also being substantially tangent to color proof 29 mounted thereon. Turret 34 has the ring gear 35 in mesh with gear 36 of motor 37, the latter being under the control of rotary switch button 38 for rotation in either direction. Mensuration of the rotation of turret 34 is accomplished by digitalizer 39 whose gear 40 engages ring gear 35, and the value so derived is the theta coordinate of the names location.

Mask part 32 is fixedly mounted on turret 34 and part 33 is movable relative to part 32 in horizontal and in vertical direction from a closed position in which its inner corner 33A overlies the inner corner 51 of part 32, resulting in no aperture between the parts, to a fully open position in which an aperture 52 with maximum dimensions of 1-inch high and 2.12 inches long may be defined. The length and height of aperture may be closely controlled. Upward motion of part 33 is actuated by slow speed motor 41 mounted for horizontal sliding motion on the guide rails 42. The shaft 43 of motor 41 is threaded and engages flange 45 of part 33 to impart up or down vertical motion to the part. Slow speed motor 46 slidably mounted on guide rails 47 has the threaded shaft 48 engaging flange 49 to impart left or right horizontal motion to part 33.

The operator through the controls 20 of the Y coordinate, 50 of the X coordinate and 38 of the theta coordinate can index the viewing mask so that the inner corner 51 of part 32 is at any point on the color proof, and further so that the aperture 52 representing the precise size and location of the name extends at any desired angle with reference to said point.

The inner corner 51 of the fixed part 32 of the viewing mask is brought to the point at the lower left-hand corner of the space to be occupied by any particular name. The operator having viewed the color proof and the name, decides on a style and size of type in which the name will appear. He pushes button 53 to indicate a choice of type style, and button 54 to indicate the size of type. He then types the name on the electric typewriter 55, which writes the name on the paper 56 in alphanumerical symbols.

The choice of type style has furnished one factor of a multiple value to a size and style matrix, and the choice of size furnishes a second value thereto, a third value being the particular character of the name. These factors result in values for length and height of the space of the particular character being fed to the motors 46, 41 which open up a space that size between the parts of the mask. The writing of each successive character of the name increases the length of aperture 52. When the name has been written on paper 56 the aperture is the exact size and location of the name space, and the "record" button 57 is pushed, recording automatically through conventional means the coordinates of the location as well as the style, size and character information of the name both on the paper 56 and on the tape 58 of the tape punch device 59 connected to typewriter 55.

As the record button 57 is pushed, a stepping switch sequences solenoid 60 to drive scriber 61 leftward of FIG. 4 to corner 51 of aperture 52, at which time solenoid 62 drives solenoid 60 and scriber 61 up to the adjacent corner, then solenoid 60 is de-energized causing scriber 61 to follow the upper perimeter of the aperture from left to right, whence by de-energizing of solenoid 62 the scriber follows the right periphery of the aperture to the point of departure. A graphic record 63 of the name space is thus scribed in its exact size and location on the color proof if the same is used without overlay, or on the overlay if the same is used. For the purpose of this description both the color proof and the overlay, each considered separately, is a map manuscript.

Both the tape 58 and the paper 56 are thus constituted complete self-contained programs for names placement, and the color proof or overlay, whichever has been scribed with names locations, becomes the graphic record of names locations. The scribing of names locations is particularly useful during the process of programing, as each name location scribed aids in the choice of style, size and location for all subsequent names.

The tape 58 may be used as an automatic control for a conventional photo typesetter 12 equipped with conventional tape reading means 64 for decoding the digital information on the tape, said means also equipping it to execute the type order constituted by such information.

In the absence of an automated photo typesetter such as 12, the paper 56 is used as a type order for a manually operated photo typesetter. The product of either the manual or automated photo typesetting is the film strip 65 containing the names in the chosen style and size of type and in the same sequence as on tape 58.

The electrocoordinatograph 13 comprises a light tight cabinet 66 housing a plane table 67 along the left perimeter of which extends the Y coordinate lead screw 68 actuated by servo motor 69. Motion of lead screw 68 is measured and monitored by the resolver 70.

The X coordinate arm 71 is a rectangular frame having inside its end piece 72 a ball nut mechanism threadedly engaged on screw 68.

The X coordinate lead screw 73 extends longitudinally of arm 71 and perpendicularly to screw 68, being rotatably mounted, and being driven by servo motor 74 and monitored by resolver 75 operatively connected thereto.

The coordinatograph head 76 is a rectangular frame slidably mounted for motion along arm 71 and having in its end member 77 ball nut means threadedly engaged with screw 73.

Substantially centrally located in head 76 is the large bore 78 the axis of which extends substantially perpendicularly to the plane of table 67.

Substantially tangent to bore 78 is the worm 79 rotatably mounted in head 76 and connected to the servo motor 80 and monitored by the resolver 81.

Rotatably mounted in bore 78 is the turret 82 comprising the worm wheel 83 fixed to said turret and engaged with worm 79.

Operatively mounted on turret 82 is the projector means 84 schematically indicated by the film spools 85, lamp 86 and lens barrel 87.

The servo motors 69, 74 and 80 and resolvers 70, 75 and 81 are effective in cooperation with tape 58 and a second tape reading device 64 identical to the one previously illustrated to cause the coordinatograph to perform as a slave unit which indexes the turret 82 to the location of each name on the tape 58 in turn. The reading device 64 also controls conventional mechanism operatively connected to projector means 84 so that the correct name is projected when its location is reached by the turret.

The names are projected to the sensitized film 88 mounted on table 67. The area outside the name location is masked by opaque variable mask means functioning similarly to mask 32, 33 under the control of the character, style and size information for the respective name on the punched tape and read out from the tape by the second device 64. The film 88 when exposed to all desired indices and developed becomes the names film 89 which may be developed as a positive or as a negative according to requirements.

The button 90, FIG. 1, is an on-off switch for the coordinatograph automatic operation, and 91 is a trouble light in circuit with lamp 86.

The above system and method is adapted to the programing of names on tape and film, the names by their nature of varied style, size, characters and coordinates requiring exact location and therefore programing.

Indicia of a different nature, such as contour numerals, vegetation symbols, etc., are highly repetitive in nature and not critical in location except that they must not interfere with other symbols. It is therefore useful first to program, scribe the location of and expose the names, and thereafter to connect the coordinatograph directly to the coordinate meter as a slave of the latter. In this mode of operation the resolvers 70, 75 and 81 drop out of the coordinatograph circuit and the synchro followers 70A, 75A and 81A become part of the circuit, receiving signals from the drive motors of the coordinate meter, and sending signals to the respective drive motors of the coordinatograph.

The coordinatograph turret 82 and projector means 84 is provided with auxiliary projection means 94 comprising a film font 92 of indicia which may be exposed to the sensitized film by indexing the coordinate meter to desired locations on the color proof and then selecting individual symbols to be exposed to the sensitized film, the selection being made by a special small keyboard 93 mounted on cabinet 14. The selection of a particular symbol of font 92 on keyboard 93 transmits a signal to the typewriter 55 where the style and size matrix transmits signals appropriate for the selected symbol to masks in the auxiliary projecting means 94 schematically indicated by the lamp 95, condenser 96 and the font actuating mechanism to be described hereafter. The auxiliary projection masking means is opaque and operates similarly to the mode of operation of mask 32, 33.

The auxiliary projection means further includes the servo motor 97 on the shaft of which is a pinion 98 engaged in a rack 99 integral with font 92. The shaft of motor 97 is further journaled in the block 100 which is a ball nut means threadedly engaged over the threaded shaft 101 of servo motor 102.

Font 92 is slidable in the ways 103 which overlie the projection aperture.

By means of motor 97 selected indicia are brought above the projection aperture. Ways 103 are also formed with a projection aperture, and by indexing motor 102 by means of keyboard 93 the ways 102 and thereby their projection aperture may be indexed sidewise to permit the side-by-side exposure successively onto the film 88 of two or more indicia, for instance in order to form a multiple digit contour numeral.

The direct connected, unprogrammed operation of the system thus permits random indexing and exposing of indicia whose exact location need not be recorded.

We claim:

1. In the art of map making, a system for the automatic making of a names film comprising the novel combination of a programmer, a photo typesetter and a coordinatograph, said programmer having means for mounting a map manuscript in view of an operator, a head movable in X, Y and theta coordinates relative to said manuscript, plural masking means mounted on said head and movable relative to each other to define between them name spaces of various heights and lengths, means for receiving and producing one record in digital and another record in alphanumerical form of data on characters, size and style of type of a name and on the X, Y and theta coordinates of said name, means originating said coordinate data from the position of said mask relative to said manuscript, means opening said mask in exact increments upon the reception of each successive character datum, and scribing means operatively associated with said mask for scribing upon said manuscript the spaces of completed names, each of said records constituting a type order on said photo typesetter for a film strip of names, and said coordinatograph comprising light tight means for operatively mounting a photosensitive film, projector means within said light tight means for receiving said film strip, means mounting said projector and movable in X, Y and theta coordinates relative to said photosensitive film, and means for decoding said digital record and moving said projector mounting means pursuant to the coordinate data of said digital record to expose each name of said film strip to said photosensitive film in the exact location on said photosensitive film to which it is programmed in said digital record.

2. A system according to claim 1 and further comprising auxiliary projector means for said coordinatograph, a film font of indicia for said auxiliary projector means, a console connected to said coordinatograph and adapted to actuate the selective projection of indicia onto said photo sensitive film, and means operatively connecting said programmer and said coordinatograph in such fashion that setting said programmer to view a particular space on said map manuscript brings the corresponding space on said photo sensitive film into the field of said auxiliary projector means and selected indicia may be exposed onto said last-mentioned space without the necessity of programming the exposure of said last-mentioned indicia.

References Cited in the file of this patent

UNITED STATES PATENTS

| | | |
|---|---|---|
| 2,220,094 | Giles | Nov. 5, 1940 |
| 2,377,801 | Mills et al. | June 5, 1945 |
| 2,646,732 | Offeman | July 28, 1953 |
| 2,847,919 | Rossetto et al. | Aug. 19, 1958 |
| 3,007,369 | Squassoni et al. | Nov. 7, 1961 |